Oct. 19, 1926.
C. E. JOHNSON
APPARATUS FOR PRODUCING ROTORS
Filed July 8, 1924
1,603,544
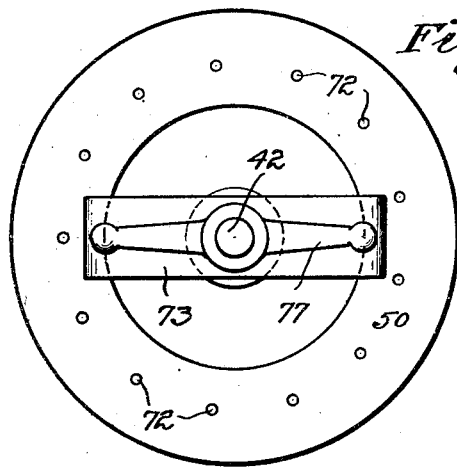
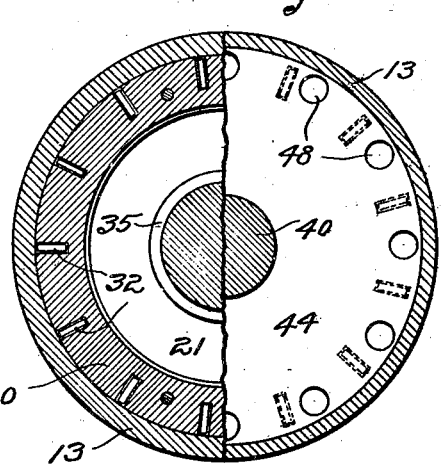
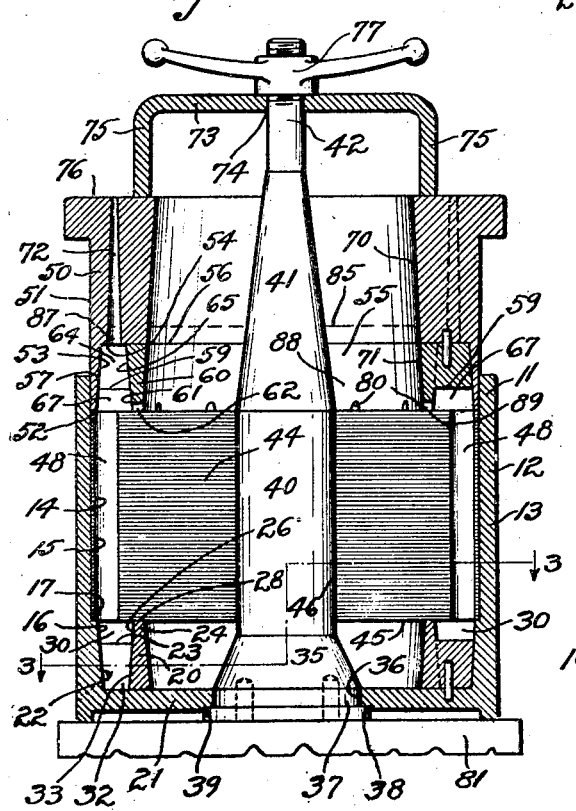
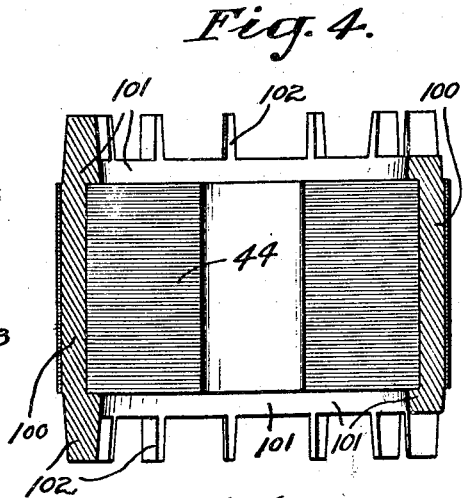
INVENTOR:
CARL E. JOHNSON,
BY
ATTORNEYS.

Patented Oct. 19, 1926.

1,603,544

UNITED STATES PATENT OFFICE.

CARL E. JOHNSON, OF LOS ANGELES, CALIFORNIA, ASSIGNOR TO UNITED STATES ELECTRICAL MANUFACTURING COMPANY, A CORPORATION OF CALIFORNIA.

APPARATUS FOR PRODUCING ROTORS.

Application filed July 8, 1924. Serial No. 724,800.

This invention relates to electrical apparatus and relates particularly to rotors for induction motors which ordinarily comprise a stator and a rotor. A rotor of the squirrel cage type comprises punchings having holes therein through which holes conductor bars are extended. On each end of these bars are secured end rings. The ends of the conductor bars are generally turned down to a reduced diameter and extended through holes provided in the end rings, the bars being subsequently riveted over and sweated to the ring to provide a good electrical contact therebetween.

A disadvantage in this method is that considerable time is taken, first, in the machine work on the conductor bars and rings; and, secondly, in the installation of the bars and rings. It is also found that the bars tend to work loose in the rings, thus producing a defective rotor.

It is an object of this invention to provide a method whereby the conductor bars and the end rings may be cast integral, and in place, thus producing a superior rotor.

It is also an object of the invention to provide a method by which a rotor of this type may be made much cheaper than before, since it requires substantially no machining.

It is a further object of the invention to provide an apparatus whereby the above process may be carried out.

It is a still further object of the invention to provide such an apparatus which will require but a small investment.

Additional objects of the invention and the advantages thereof will be made evident hereinafter.

Referring to the drawings which are for illustrative purposes only,

Fig. 1 is a vertical section through a device embodying the features of my invention.

Fig. 2 is a plan view thereof.

Fig. 3 is a section taken on a plane as indicated by the line 3—3 of Fig. 1.

Fig. 4 is a section through a rotor having the conductor bars and rings cast in the fashion of my invention.

In the form of the invention shown, I provide a mold 11 which consists of a body 12 having a cylindrical wall 13. The inner face 14 of the wall 13 provides a cylindrical portion 15 and a conical portion 16, which converges at the lower end thereof, these portions 15 and 16 being separated by an annular ledge 17. A body ring 20 is secured in the body 12 so as to rest on the bottom 21 thereof. The outer face 22 of the ring 20 is conical so as to register with the conical face 16 of the body 12. The upper face 23 of the ring 20 extends in a plane below the annular ledge 17, as shown. Extending upwardly from the inner edge of the face 23 is an annular lip 24, having a conical outer face 26 which tapers to the same extent as the face 16 but in an opposite direction. The upper face 28 of the lip 24 is arranged to extend into the same radial plane as the annular ledge 17. The upper portion of the face 16 of the body 12, the upper face 23 of the ring 20, and the outer face 26 of the lip 24 cooperate to provide a lower annular ring channel 30. The ring channel 30, as clearly shown in Fig. 1, converges and is narrower at the lower portion thereof. At intervals throughout the ring, wing slots 32 are cut from the outer face 22 thereof. The inner face 33 of the wing slots 32 are arranged to extend in a plane aligning with the outer face 26 of the lip 24. A mandrel bar 35 is shown as being extended through an opening 36 in the bottom 21 so that the face 37 rests in the opening 36 and the shoulder 38 rests against the annular face 39 provided on the bottom 21, the hole 36 being concentric with the inner face 14 of the body 12. The mandrel 35 extends upwardly and has a cylindrical portion 40, a tapered portion 41 and a threaded portion 42.

Punchings 44 are assembled in the body 12, as shown. The lowermost punching 45 is arranged to rest on the annular ledge 17 and the upper face 28 of the lip 24. The outside diameter of the punchings 44 is of the same diameter as the face 14 and the inside diameter 46 of the punchings 44 is of the same diameter as the cylindrical portion 40 of the mandrel 35. Because of this, it will be seen that the punchings 44 will be very accurately aligned when placed in the body 12. The punchings 44 are provided with a plurality of holes 48 which are also aligned when placed in the body 12. A cap 50 having an outer cylindrical face 51 is then positioned so that this face 51 extends into the upper end of the casting of the body 12 and so that an annular ledge 52 provided between the face 51 and the conical inner face 53 will rest on the uppermost of the punchings 44. The conical face 53 extends upwardly and meets with an annular and radial face 54, provided by the cap 50. A cap ring 55 which is substantially identical with the body ring 20 is then placed so that the upper edge 56 thereof rests against the face 54 and that the conical outer face 57 rests against the face 53 of the cap 50. The lower face 59 rests in a plane above the ledge 52, as shown in Fig. 1. Extending downwardly from the inner edge of the lower face 59 is an annular lip 60, which has an outer conical face 61 which tapers to the same extent as does the conical face 53 of the body 50 but extends in an opposite direction thereto. The lower face 62 of this lip terminates in the same plane with the ledge 52. The ring 55 is also provided with wing slots 64 which are cut from the outer face 57 and have the face 65 thereof cut conical to align with the conical face 61 of the lip 60. The lower edge of the face 53 of the body 50, the lower face 59 of the ring 55, and the outer face 61 of the lip 60 cooperate to provide an upper annular ring channel 67. From comparison, it will be seen that the ring channels 30 and 67 are identical in shape, but in inverted relationship, and that the wing slots 32 and 64 are also identical in shape, but inverted. The cap 50 provides an opening 70 which converges at the upper end thereof. The inner face 71 of the ring 55 extends in a plane parallel to the face of the opening 70, as shown. Vents or risers 72 may be extended upwardly through the cap 50 from the upper ends of each of the slots 64, as shown, these risers 72 being tapered upwardly.

A yoke 73 may then be positioned so that the pin 42 extends through a hole 74 thereof, and so that the legs 75 rest against the upper face 76 of the cap 50. A suitable handled nut 77 is then screwed onto the threaded portion 42 of the mandrel 35 and tightened in such a manner as to force the cap 50 downwardly so that the punchings 44 are very securely clamped between the ledge 17 and the face 28 of the body 12 and the ledge 52 and the face 62 of the cap 50.

After the punchings have been placed in the mold and securely tightened as just described, the mold may then be placed in a suitable preheating furnace and preheated and poured through the central opening 70 with a high grade of pure aluminum metal which has previously been melted. The metal entering the opening 70 passes through the passages 80 provided in the lip 60 and flows downwardly through the openings 48 of the punchings 44 into the lower ring channel 30 and into the lower wing slots 32. After pouring the mold full, as the metal cools slightly and shrinks, it may be followed up with a little more metal, being poured through the opening 70, to compensate for the shrinkage. Any gas which forms in the mold 11 may pass out through the risers 72. When the job is completed, it is allowed to cool in a suitable manner.

My experience has proven that the entire operation is very sensitive and that certain regulations must be faithfully carried out. For example, if the molds are too cold when the metal is poured, it will be found that the rings when taken out of the mold are usually cracked or checked, which proves that the degree of preheating of the molds, the proper temperature of the metal when poured and the rate of cooling must be very closely controlled. Through experience I have found that it is desirable to preheat the mold to a temperature of between 775 degrees and 825 Fahrenheit. This is a temperature just below the red point. I have also found that the success of the process depends very largely upon the proper temperature of the aluminum. I have found that if the aluminum is heated to a temperature of between 1475 degrees and 1500 degrees Fahrenheit, favorable results may be obtained. It is also extremely important that the job be cooled in proper manner. The job should be allowed to cool very slowly and gradually so that the conductor bar portions and the end ring portions may cool substantially the same. It has been found empirically that if the metal cools too rapidly, the end rings will cool off faster than the conductor bars and will contract in such a manner that the metal is very likely to crack.

It is very desirable to place the mold upon a suitable vibrator or shaker 81 (Fig. 1) during and immediately after the pouring of the metal so that the gases may be thoroughly released from the mold and blow holes thereby substantially obviated.

After proper cooling, the rotor is removed from the mold, this being done by removing the nut 77, the yoke 73 and the cap 50. The metal may fill the mold 11, as indicated at 85; the cap may be easily removed, however, due to the draft which is provided on all the surfaces. The mandrel may then be removed and the rotor removed from the body in a suitable manner. The finished product is shown in Fig. 4, the short pins 87 which may fill the lower end of the risers being removed, and the central body 88 being removed by a separation from the rings at 89 at the outer edge of the passages 80. By inspection of Fig. 4, it will be seen that conductor bars 100 and end rings 101 are provided integral, the rings 101 having integral wings 102 which are for the purpose of creating a circulation of air when rotated, for ventilation.

It will be recognized that owing to the fact that the punchings are forcibly clamped together by the casting, they will be held rigidly together by the integral bars 100 and rings 101.

It will also be seen that by casting the bars and rings as described in a mold of this character, a smooth and accurate job will be produced which will require no machining.

Although I have herein described one complete embodiment of my invention, it will be understood that various features thereof might be independently employed and also that various modifications might be made by those skilled in the art, without the slightest departure from the spirit and scope of my invention, as the same is indicated above and in the following claims.

I claim as my invention:

1. In a mold for the purpose described, the combination of: a body in which punchings may be placed; a cap; and means for clamping said punchings together.

2. In a mold for the purpose described, the combination of: a body in which punchings may be placed; a cap; and means for compressing said cap against said punchings to clamp said punchings together.

3. In a mold for the purpose described, the combination of: a body having a lower ring channel, said body being arranged to receive punchings; a cap having an upper ring channel; and means for compressing said cap so as to clamp said punchings between the walls of said channels.

4. A mold as in claim 3 in which said body and said cap are provided with wing slots.

5. A mold as in claim 3 in which said cap has a central pouring opening.

6. In a mold for the purpose described, the combination of: a body in which punchings may be placed; a cap; a mandrel extending through an opening in said body and openings in said punchings; a yoke; and a nut on said mandrel for forcing said yoke against said cap in a manner to clamp said punchings together.

7. In a mold for the purpose described, the combination of: a body having a lower channel, said body being arranged to receive punchings; a body ring adapted to fit within said body and to cooperate therewith to form a lower ring channel; a cap having an upper channel; and means for compressing said cap so as to clamp said punchings between the walls of said channels.

8. In a mold for the purpose described, the combination of: a body having a lower channel, said body being arranged to receive punchings; a body ring adapted to fit within said body and to cooperate therewith to form a lower ring channel; a cap having an upper channel; a cap ring arranged to fit within said cap and to cooperate therewith to form an upper ring channel; and means for compressing said cap so as to clamp said punchings between the walls of said channels.

9. In a mold for the purpose described, the combination of: a body having a lower channel, said body being arranged to receive punchings; a body ring adapted to fit within said body and to cooperate therewith to form a lower ring channel, said body ring having wing slots formed therein; a cap having an upper channel; and means for compressing said cap so as to clamp said punchings between the walls of said channels.

10. In a mold for the purpose described, the combination of: a body having a lower channel, said body being arranged to receive punchings; a body ring adapted to fit within said body and to cooperate therewith to form a lower ring channel; a cap having an upper channel, a cap ring arranged to fit within said cap and to cooperate therewith to form an upper ring channel, said body ring and said cap ring having wing slots formed therein; and means for compressing said cap so as to clamp said punchings between the walls of said channels.

11. In a mold for the purpose described, the combination of: a body having a lower ring channel, said body also having a ledge to receive punchings; a cap having an upper ring channel, said cap also having a ledge to engage said punchings; and means for compressing said cap so as to clamp said punchings between the walls of said channels.

12. In a mold for the purpose described, the combination of: a body having a ledge to receive punchings; a cap; and means for compressing said cap to clamp said punchings together.

13. In a mold for the purpose described, the combination of: a body; and a body ring arranged to fit within said body and adapted to cooperate with said body to form a lower ring channel.

14. In a mold for the purpose described, the combination of: a body; a body ring arranged to fit within said body and adapted to cooperate with said body to form a lower ring channel; a cap; and a cap ring arranged to fit within said cap and adapted to cooperate with said cap to form an upper ring channel.

15. In a mold for the purpose described, the combination of: a body; and a body ring arranged to fit within said body and adapted to cooperate with said body to form a lower ring channel and wing slots.

16. In a mold for the purpose described, the combination of: a body; a body ring arranged to fit within said body and adapted to cooperate with said body to form a lower ring channel; a cap; and a cap ring arranged to fit within said cap and adapted to cooperate with said cap to form an upper ring channel and wing slots.

In testimony whereof, I have hereunto set my hand at Los Angeles, California, this 2nd day of July, 1924.

CARL E. JOHNSON.